United States Patent [19]
Moati et al.

[11] Patent Number: 5,329,618
[45] Date of Patent: Jul. 12, 1994

[54] LOOK-UP TABLE FOR A BRIDGE IN A DATA COMMUNICATIONS SYSTEM

[75] Inventors: Yossef Moati, Haifa; Ilan Glazer, Tel-Aviv; Gabi Ben-David, Carmiel; Yoram Rimoni, Haifa; Moshe Zaiger, Kiryat Haim; Yechiel Kurtz, Haifa, all of Israel

[73] Assignee: Fibronics Ltd., Haifa, Israel

[21] Appl. No.: 862,459

[22] Filed: Apr. 2, 1992

[51] Int. Cl.⁵ .............................................. G06F 13/00
[52] U.S. Cl. ................... 395/200; 370/85.13
[58] Field of Search ............ 395/200, 275, 325; 370/85.13

[56] References Cited

U.S. PATENT DOCUMENTS

4,922,503 5/1990 Leone ..................... 370/85.13
5,159,701 10/1992 Barnes et al. .................. 455/15

*Primary Examiner*—Robert L. Richardson
*Attorney, Agent, or Firm*—Helfgott & Karas

[57] ABSTRACT

A look-up table for use in a bridge employing negative filtering for interconnecting first and second networks in a data communications system. Associated with each data transmission is a source and destination address each having a total of (m+n) binary data bits, the bridge passing the data transmission from one network to the other unless the destination address is found in the look-up table and corresponds to the sending network. The look-up table comprises an encoding means responsive to an (m+n) bit address for producing first and second codes having respectively m and n bits of data which together allow the (m+n) bit address to be decoded unambiguously, a random access memory (RAM) coupled to the encoding means and having m addressable locations each for storing at least n bits of data, and a contents addressable memory (CAM) coupled to the encoding means and having a plurality of addressable locations each for storing at least (m+n) bits of data. If the location in RAM whose address is equal to the first code is available, then the second code is stored in the location. Otherwise, if the second code is not stored therein already, then all (m+n) bits of the (m+n) bit address are stored in an available location in the CAM unless they are stored therein already. A destination address is looked up by reading the contents of the CAM as well as the contents of the location in the RAM whose address is equal to the first code.

10 Claims, 10 Drawing Sheets

LOOK-UP TABLE FOR A BRIDGE IN A DATA COMMUNICATIONS SYSTEM

FIELD OF THE INVENTION

This invention is related to data communications systems including networks having different communications protocols, and wherein it is desired to transmit data from one such network to another via a gateway or a bridge. The invention is particularly concerned with the look-up table in such a bridge.

BACKGROUND OF THE INVENTION

In such a system, the bridge is responsible for establishing whether the data reaching the bridge from a node in the first network is transmitted to a different node in the same network and is therefore discarded by the bridge or, alternatively, is to be passed to the second network. Furthermore, in the event that data is to be passed from one network to the other, the bridge is also responsible for translating the data from the protocol of the first network to the protocol of the second network.

In order to determine whether data is to be rejected (i.e. transmitted to a different node in the first network) or is to be passed to the second network, the data must include a source address and a destination address corresponding, respectively, to an address of a node in the source network and an address of a node in the destination network. Thus, if this data points to nodes in different networks, then the bridge must pass the data from one network to the other; whilst if the source and destination addresses point to nodes in the same network, the data obviously does not need to be passed by the bridge. In such network systems, there is associated with the bridge a look-up table for storing therein addresses associated with nodes in one of the networks, whereby suitable logic associated with the bridge may determine whether the data is to be rejected or passed by the bridge according to the destination address associated with the data.

It will be apparent that two different approaches may be adopted when determining what is to be done with the data. According to both approaches, the destination address associated with data reaching the bridge is looked up in the look-up table within the bridge and, if found therein, permits data either to be rejected by the bridge or, alternatively, to be passed through the bridge to the other network, according to whether the source and destination addresses point to the same or different networks.

The two approaches differ in the event that a particular destination address is not found in the look-up table. In accordance with a first approach, the addresses stored in the look-up table correspond to the addresses of each node in the receiving network. In this case, if the destination address associated with data reaching the bridge is not found in the look-up table, this indicates that data is not to be passed through the bridge, it being assumed that the addresses associated with all nodes in the receiving network are known to the look-up table. This approach is called "positive filtering" since the bridge, in effect, filters out any data whose destination address is not known to the look-up table and prevents such data from being passed therethrough.

The disadvantages with so-called "positive filtering" networks are that they are protocol dependent and space-limited. Therefore, so-called "negative filtering" bridges are employed wherein the addresses associated with all nodes in the sending network are stored in the look-up table, such that if the destination address associated with data reaching the bridge is not found in the look-up table, this is taken to imply that the receiving network is different from the sending network and that data must therefore be passed by the bridge to the non-sending network.

Data communications systems are international in scope and must be able to pass data correctly from one part of the world to any other part thereof. Typically, local area networks (LANs) communicate with each other via an FDDI network which itself is a particular type of LAN having a high bandwidth and permitting very fast data transfer.

Obviously, in such a comprehensive arrangement each node in all of the LANs as well as each node in the FDDI must have its own, unique source address. The source address of a network node is established by the manufacturer thereof, each manufacturer having at his disposal a batch of source addresses which he allocates successively to each network node during manufacture. In order to guarantee that the source address allocated by one manufacturer will not inadvertently clash with the source address allocated by a different manufacturer, it is standard to identify each manufacturer with a different index, which is then concatenated by a code given by the manufacturer in order to generate the source address associated with each network node. Since the index associated with different manufacturers is different, it follows that even if the manufacturer codes themselves coincide, the concatenated code constituting the source address must, inevitably, be unique.

However, in order that such a scheme may provide a sufficient number of unique source addresses to accommodate all known communications systems and to allow for projected reasonable expansion thereof, it follows that the number of bits of binary data associated with each code generated by the manufacturer must be very large indeed. Additionally, in order not to restrict unduly the number of competing manufacturers, the index code allotted to each different manufacturer must likewise have a sufficient number of different permutations. Both of these desiderata result in the fact that source addresses associated with such networks contain a very large number of binary data bits. Typically, 48 binary data bits are used in order to accommodate each unique source address.

If such a large number of binary data bits is to be stored in the look-up table associated with each bridge in the data communications system, then it is clear that extremely high capacity memory is required.

A further requirement of look-up tables in network bridges is that data access time must be very fast, typically in the order of several hundred nano-seconds. Thus, if each source address is stored in a random access memory (RAM) having a plurality of addressable locations each containing 48 bits of data, then in order to determine whether a particular address is stored therein, each addressable location must be read sequentially, the contents of each addressable location being logically processed in order to determine whether they correspond to the required address. This is clearly a time-consuming process.

Therefore, it is known to use a contents addressable memory (CAM) which contain on-chip logic to permit, in effect, all the addressable memory locations therein to be scanned simultaneously in order to establish whether a particular address is stored therein. However, a major drawback of CAMs is that they are expensive: typically U.S.$20 for a CAM having 256 addressable locations each containing 48 bits. Clearly, then, using CAMs to build even a moderately sized look-up table requiring maybe 100 or more CAMs would be prohibitively expensive.

It is known that data communications systems are dynamic and since the capacity of the look-up table is necessarily finite and memory is at a premium, destination addresses stored in the look-up table which are not used for a predetermined time period, should be deleted from the look-up table so as to leave room for the storage of destination addresses relating to actual usage. In a practical system, this is accomplished by associating an aging flag with each destination address stored in the look-up table, the aging flag typically comprising a plurality of memory data bits which are either decremented or incremented during successive time periods until the aging flag reaches a lower or upper threshold, whereupon the addressable location in the look-up table associated with that destination address becomes available for the storage of new data. Obviously, each time a new address is stored in the look-up table, the corresponding aging flag is initialized and each time the look-up table is scanned for a particular destination address which is found therein, the aging flag must likewise be reinitialized.

Since, under certain circumstances, it may be required not to delete destination addresses from the look-up table, regardless of their aging flag, a write-protect mechanism may also be employed so as to specify that the associated data is write-protected and must never be over-written.

Clearly, the provision of a write-protect mechanism as well as an aging flag requires yet additional binary data bits which still further increase the required capacity of the look-up table.

SUMMARY OF THE INVENTION

It is an object of the invention to provide a look-up table in which the drawbacks described above are significantly reduced or eliminated.

According to the invention there is provided a bridge for interconnecting first and second networks in a data communications system, each network including a plurality of nodes having respective source addresses, said bridge being responsive to a destination address associated with a data transmission reaching the bridge from one of the nodes in the first network for forwarding the data transmission to the second network unless the destination address corresponds to an address in the first network, said source and destination addresses each having a total of $(m+n)$ binary data bits;

a look-up table for storing the destination addresses therein, comprising:
  an encoding means responsive to an $(m+n)$ bit address for producing first and second codes having respectively m and n bits of data which together allow the $(m+n)$ bit address to be decoded unambiguously,
  a random access memory (RAM) coupled to the encoding means and having m addressable locations each for storing at least n bits of data, and
  a contents addressable memory (CAM) coupled to the encoding means and having a plurality of addressable locations each for storing at least $(m+n)$ bits of data; wherein:

if the location in RAM whose address is equal to the first code is available, then the second code is stored in said location,
  if the location in RAM whose address is equal to the first code is not available and the second code is not stored therein already, then all $(m+n)$ bits of said $(m+n)$ bit address are stored in an available location in the CAM unless they are stored therein already, and
  a destination address is looked up by reading the contents of the CAM as well as the contents of the location in the RAM whose address is equal to the first code.

In a preferred embodiment of the invention, the first code is equal to the m least significant bits of the $(m+n)$ bit address and the second code is equal to the n most significant bits thereof. In this case, the second code may correspond to the index number allotted to a particular manufacturer, the first code being the cyclic code allocated by the manufacturer himself.

BRIEF DESCRIPTION OF THE DRAWINGS

For a clearer understanding of the invention and to see how the same may be carried out in practice, one preferred embodiment of the invention will now be described, by way of non-limiting example only, with reference to the accompanying drawing, in which.

DETAILED DESCRIPTION OF A PREFERRED EMBODIMENT

Figure 1:
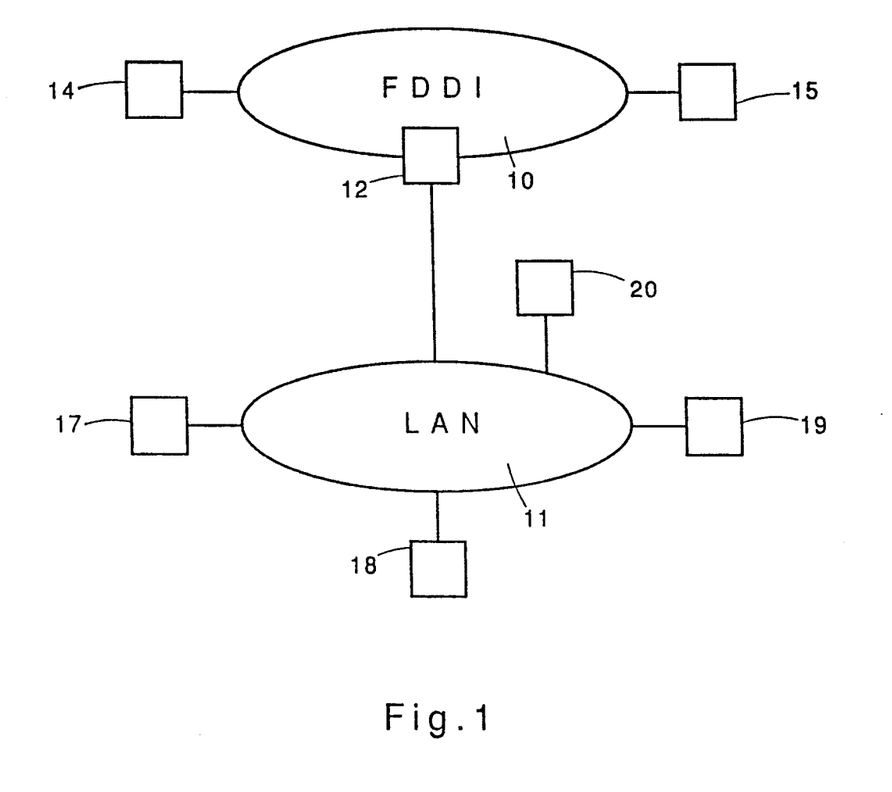
FIG. 1 is a schematic representation of a data communications system including a bridge containing a look-up table according to the invention.

FIG. 1 shows an FDDI network designated generally as 10 coupled to a local area network (LAN) 11 via a bridge 12. Associated with the FDDI 10 are a plurality of nodes such as 14 and 15. Likewise, the LAN 11 contains nodes 17, 18, 19 and 20.

Figure 2:
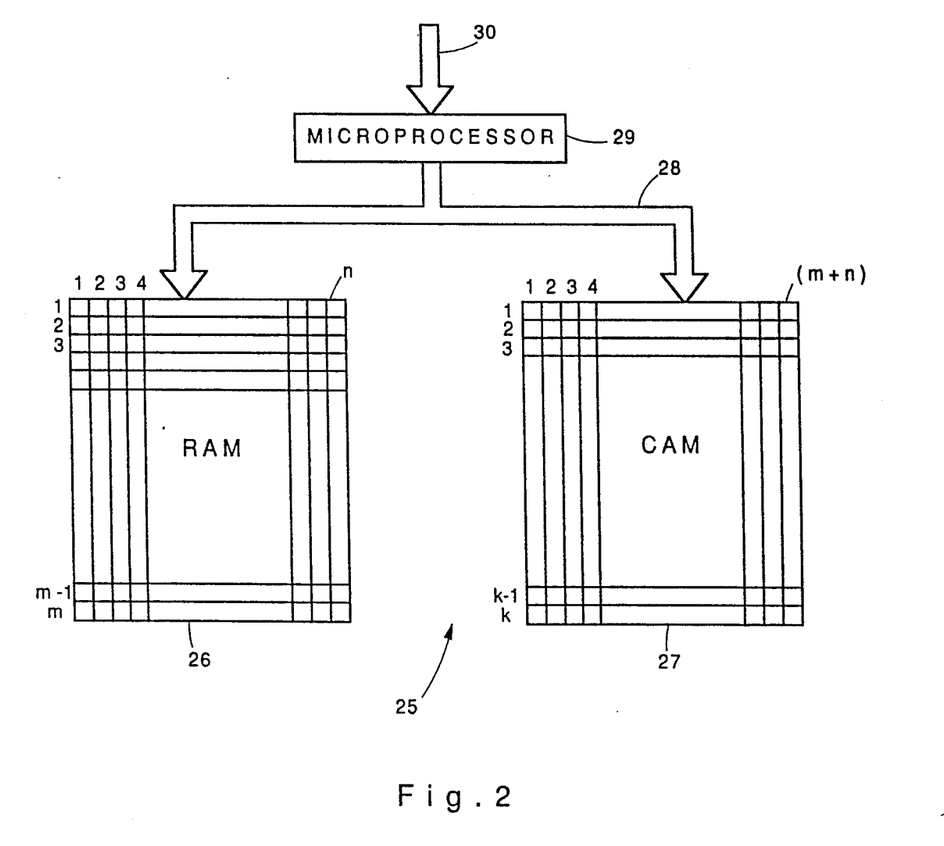
FIG. 2 is a pictorial representation of a look-up table for use in the bridge shown in FIG. 1.

FIG. 2 is a pictorial representation of a look-up table designated generally as 25 for use in the bridge 12 shown in FIG. 1. Thus, the look-up table 25 includes a random access memory (RAM) 26 and a contents addressable memory (CAM) 27 both of which are connected by a common databus 28 to a microprocessor 29 to which a 48 bit destination address is fed via a databus 30.

The RAM 26 is a static RAM having 256K addressable locations each accommodating 35 binary data bits. The CAM 27 actually comprises an array of four CAMs each having 256 addressable locations each accommodating 50 binary data bits. Thus, altogether, there are 1024 addressable memory locations in the CAM 27.

When a destination address is required to be looked up in the look-up table 25, the RAM 26 and CAM 27 are both read simultaneously in order to establish whether the requisite destination address is stored in either one of them.

Figure 3:
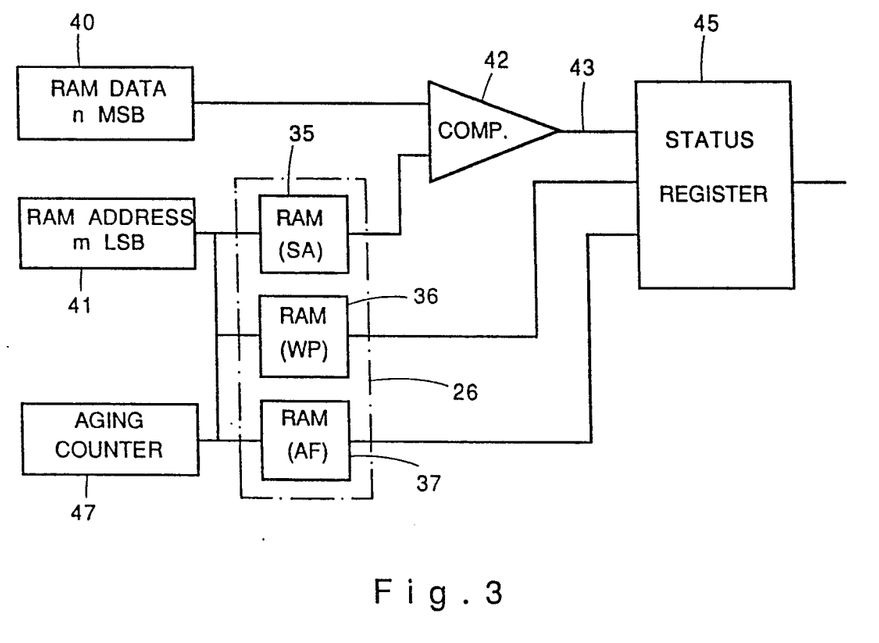
FIG. 3 is a block diagram showing schematically the circuitry associated with the RAM shown in FIG. 2.

FIG. 3 is a simplified circuit diagram showing functionally the circuitry associated with the RAM 26. Thus, the RAM 26 comprises three component RAMs 35, 36 and 37 constituting first, second and third RAMs, respectively. The first RAM 35 has 256K addressable memory locations each containing 32 bits and stores the address data by means of which destination addresses associated with data transmissions are actually looked up The second RAM 36 also has 256K addressable memory locations each containing a single binary bit and each of which stores a write protect flag relating to the corresponding addressable location in the first RAM 35. Likewise, the third RAM 37 has 256K addressable memory locations each corresponding to a respective addressable location in the first RAM 35 and each containing two binary data bits constituting an aging flag.

A 48 bit address is split into two components: one containing the 32 most significant bits (MSB) and the other containing the 16 least significant bits (LSB). The 32 MSB constitute RAM DATA and are stored in a RAM DATA register 40 whilst the 16 LSB constitute a RAM address and are stored in a RAM ADDRESS buffer 41. The RAM address stored in the RAM address buffer 41 constitutes a first code whilst the RAM data stored in the RAM ADDRESS buffer 40 constitutes a second code such that the first and second codes permit the 48 bit address to be decoded unambiguously. In the preferred embodiment such decoding is a trivial operation, merely requiring concatenation of the first code to the second code.

Connected to an output of the first RAM 35 as well as to the RAM DATA buffer 40 is a comparator 42 which compares the contents of the first RAM 35 with the contents of the RAM DATA buffer 40 and produces at an output 43 thereof a signal of a predetermined logic level in the event that the two 32 bit sequences match. A status register 45 is coupled to the output 43 of the comparator 42 as well as to the second and third RAMs 36 and 37 for producing a variable flag corresponding to the status of the destination address and indicating (1) whether it is found in the first RAM and, if so, (2) whether the corresponding address is write-protected and (3) whether its aging flag indicates that the corresponding addressable location in the first RAM 35 is now available.

The aging is determined by an aging counter 47 which simply scans the third RAM 37 so as to read each addressable location in turn and decrement the contents thereof by one. Wherever data is stored in the first RAM 35, the corresponding aging flag in the third RAM 37 is set to $11_2$, such that when the aging counter 47 has gone through the cycle three times and the corresponding aging flag reaches zero, this indicates that the contents of the corresponding addressable location in the first RAM 35 are now available unless, of course, the corresponding write-protect flag in the second RAM 36 indicates that the addressable location is write-protected.

Figure 4:
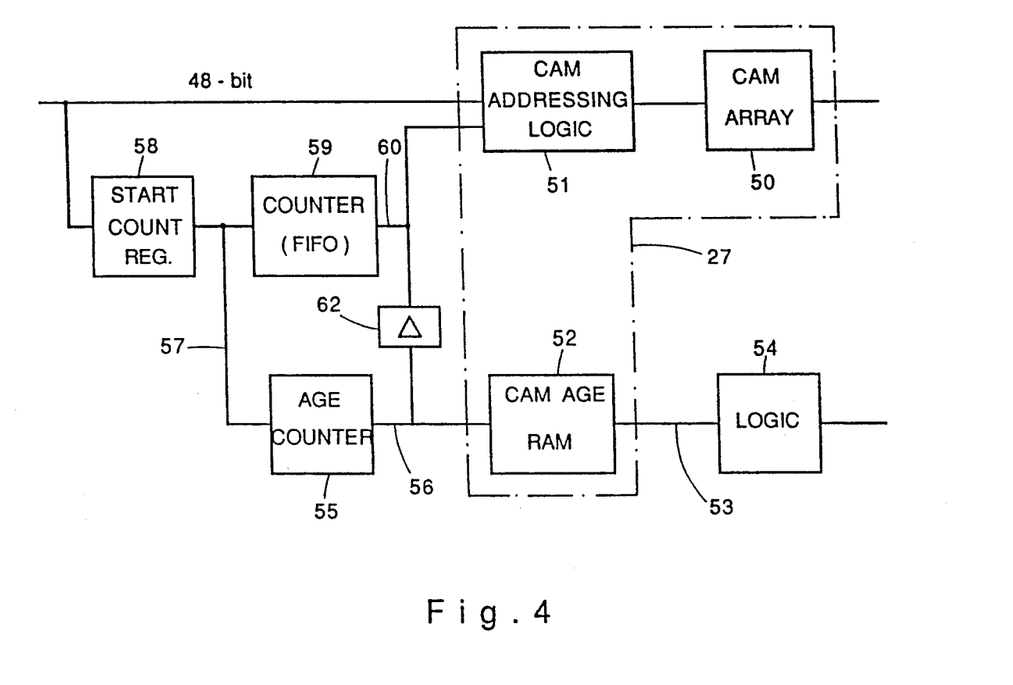
FIG. 4 is a block diagram showing schematically the circuitry associated with the CAM shown in FIG. 2.

Referring now to FIG. 4 there is shown schematically, in simplified form, the circuitry relating to the CAM 27 shown in FIG. 2.

Thus, the CAM 27 actually comprises an array of four CAMs depicted as a single unit 50 and having altogether 1024 addressable locations each containing 48 binary data bits. Associated with the CAM array 50 is a CAM addressing logic unit 51 and a CAM AGE RAM 52. An output 53 of the CAM AGE RAM 52 is connected to a logic unit 54 which, effectively, determines the status of the corresponding addressable location in the CAM array 50 and determines whether a particular addressable location is available for the storage therein of new data.

The aging itself is determined by means of an age counter 55 having an output 56 coupled to the CAM AGE RAM 52 and an input 57 coupled to a start count register 58 and also a shift register counter (FIFO) 59 having an output 60 connected to the CAM addressing logic 51. The output 56 of the aging counter 55 is coupled via a logic buffer 62 to the CAM addressing logic 51.

The circuitry described functionally with reference to FIGS. 3 and 4 of the drawings is used both in order to determine whether a particular destination address is stored in the look-up table 25 and also to learn new source addresses associated with the FDDI 10. Thus, whenever data is transmitted by the FDDI 10 and reaches the bridge 19 the source address associated with the transmitted data is stored in the look-up table 25 such that the look-up table 25 learns addresses associated with the FDDI 10 whenever data transmitted by the FDDI 10 reaches the bridge 12.

If the destination address associated with the transmitted data corresponds to one of the addresses stored in the look-up table 25, this means that the destination address associated with the transmitted data corresponds to a node in the FDDI 10 since it is only those addresses which are stored in the look-up table 25 in the first place. Thus, in the event that a destination address is found in the look-up table 25, there is no need for the bridge 12 to pass the data. On the other hand, if the destination address is not found in the look-up table 25, this is taken to imply that the destination address corresponds to a node in the LAN 11 and the transmitted data is passed by the bridge 12. It could, however, also mean simply that the destination address corresponds to a node in the FDDI 10 which has not transmitted data to the bridge 12 within at least a predetermined period of time and whose address has not, therefore, been learned by the look-up table 25.

Thus, whenever data is transmitted by the FDDI 10 and reaches the bridge 12, the source address associated with the transmitted data is "learned" by the look-up table 25 and the destination address associated with the transmitted data is looked up in the look-up table 25 in order to determine whether the data should be passed by the bridge 12.

Figure 5:
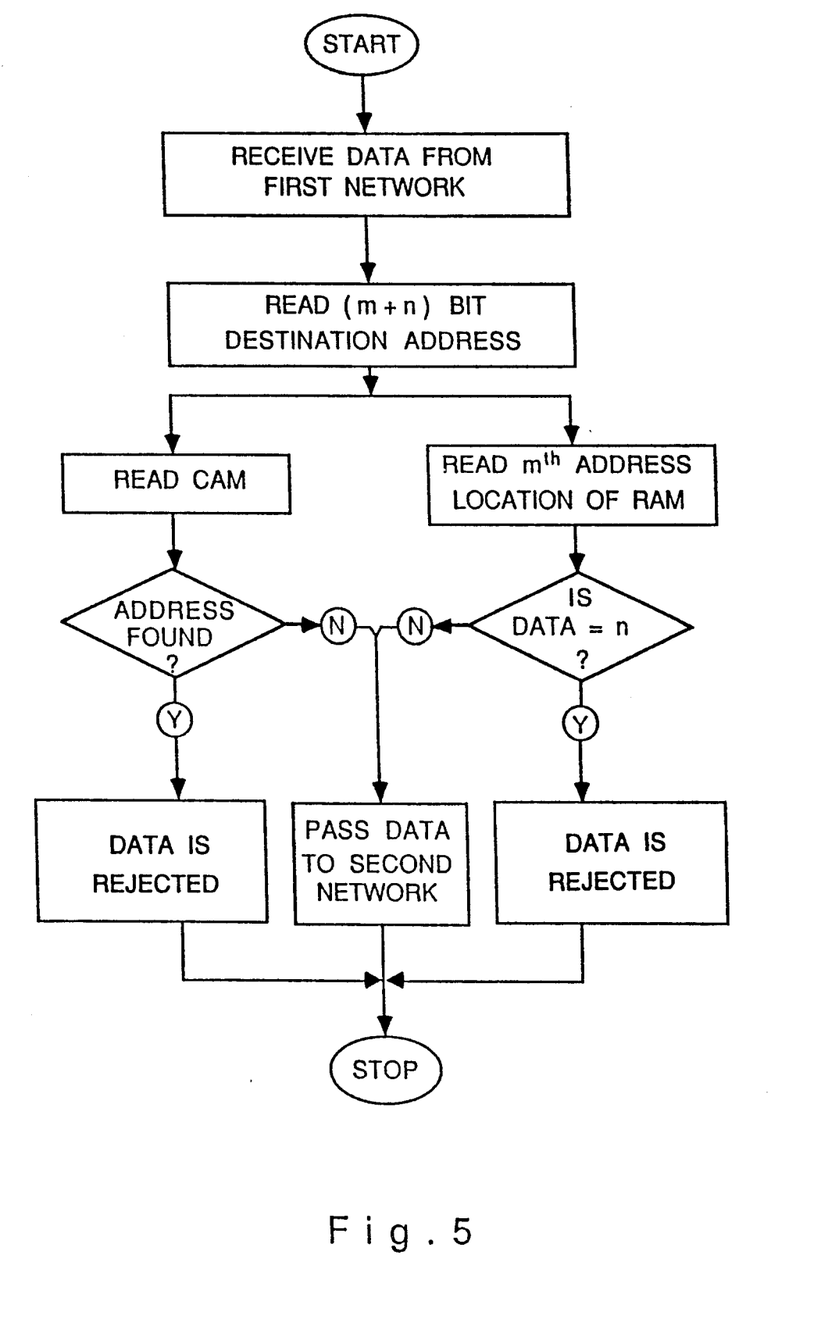
FIG. 5 is a flow diagram showing the main operating steps associated with the look-up table shown in FIG. 2.

Referring now to FIG. 5 of the drawings, the principal operating steps associated with the looking-up of destination addresses in the look-up table 25 will now be explained.

A 48 bit destination address is split into two components: one containing the 32 MSB and the other containing, the 16 LSB. The 16 LSB stored in the RAM ADDRESS buffer 41 points to a particular addressable location in each of the three RAMs 35, 36 and 37. The contents of the corresponding addressable location in the first RAM 35 are a 32 binary data bit sequence which is compared by the comparator 42 with the 32 MSB stored in the RAM DATA buffer 40. In the event that the two match, the comparator 42 produces a suitable logic signal at its output 43, allowing the bridge 12 (FIG. 1) to reject the data.

At the same time, the 48 bit destination address is fed to the CAM addressing logic 51 whereby it is determined whether the destination address is stored in one of the CAM arrays 50. It is thus determined whether the destination address is stored either in the RAM 26 or the CAM 27 (FIG. 2), in which case data is not passed by the bridge 12. Alternatively, if the destination address is not found in the look-up table 25, then the data is indeed passed by the bridge 12.

Figure 6:
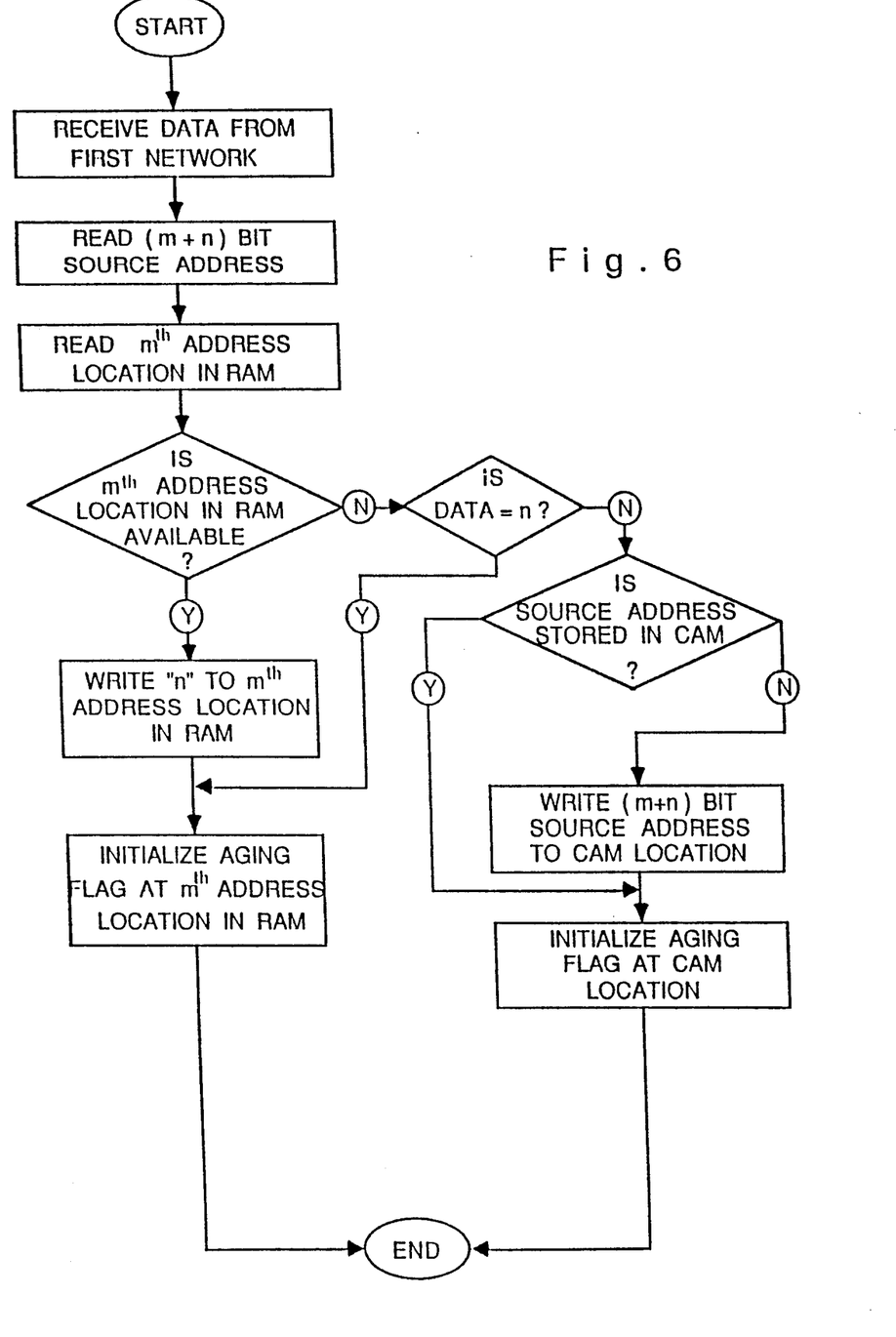
FIG. 6 is a flow diagram showing the main operating steps associated with a learning algorithm for use with the look-up table shown in FIG. 2.

FIG. 6 shows the principal operating steps associated with learning new source addresses for storage either in the RAM 26 or the CAM 27 shown in FIG. 2. In the first instance, the source address is encoded as explained above so as to produce a 16 bit RAM ADDRESS code corresponding to the 16 LSB and a 32 bit RAM DATA code corresponding to the 32 MSB. The contents of the first RAM 35 at the addressable location corresponding to the 16 LSB are read and compared with the 32 bit RAM DATA code, in order to establish whether the source address is stored in the first RAM 35. If the corresponding aging flag in the third RAM 37 indicates that the addressable location is available for storing new data and the corresponding flag in the second RAM 36 indicates that this addressable location is not write-protected, then the data is written in the first RAM 35 and the corresponding aging flag in the third RAM 37 is initialized.

On the other hand, if different data is already stored in the addressable location of the first RAM 35 corresponding to the 16 LSB RAM ADDRESS code and the corresponding aging flag in the third RAM 37 indicates that this location in the first RAM 35 is not available for storing new data or the second RAM 36 indicates that this location is write-protected (in which case the corresponding addressable location in the first RAM 35 is, of course, not available), then the complete 48 bit source address is stored in the CAM array 50 shown in FIG. 4.

In this case, the aging flag stored in the addressable location of the CAM AGE RAM 52 corresponding to the addressable location in the CAM array 50 wherein the source address was written is initialized to $11_2$.

It might be, of course, that the source address is already stored either in the first RAM 35 or in the CAM array 50, in which case all that need be done is to reinitialize the corresponding aging flag to $11_2$.

Figure 7:
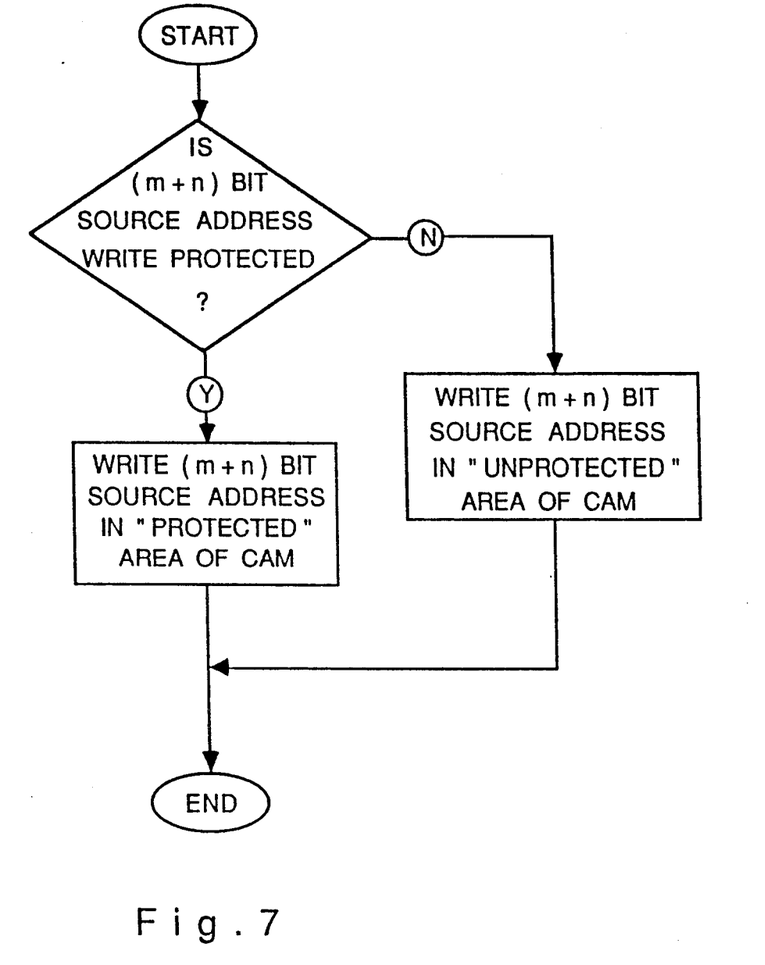
FIG. 7 is a flow diagram showing the main operating steps associated with storing new address data in the CAM shown in FIG. 2.

FIG. 7 shows the principal operating steps associated with storing data in the CAM array 50. It should be noted that the manner in which data in the CAM array 50 is write-protected is different to the manner in which data in the first RAM 35 is write-protected. So far as the first RAM 35 is concerned, a write-protect bit is stored in the second RAM 36 whereby it may be determined whether each corresponding addressable location in the first RAM 35 is write-protected or not.

However, there is no separate write-protect bit associated with the CAM array 50. Instead, a predetermined area of the CAM array 50 is allocated for storing therein write-protected source addresses. Thus, when it is desired that a particular source address in the CAM array 50 be write-protected, the source address must be moved to the write-protected area therein. If, in fact, the write-protected area is full, it can be increased in size so as to occupy space that was previously associated with non write-protected data. However, in this case, all data within the non write-protected area must be shifted down so that as not to occupy space which is now write-protected.

Figure 8:
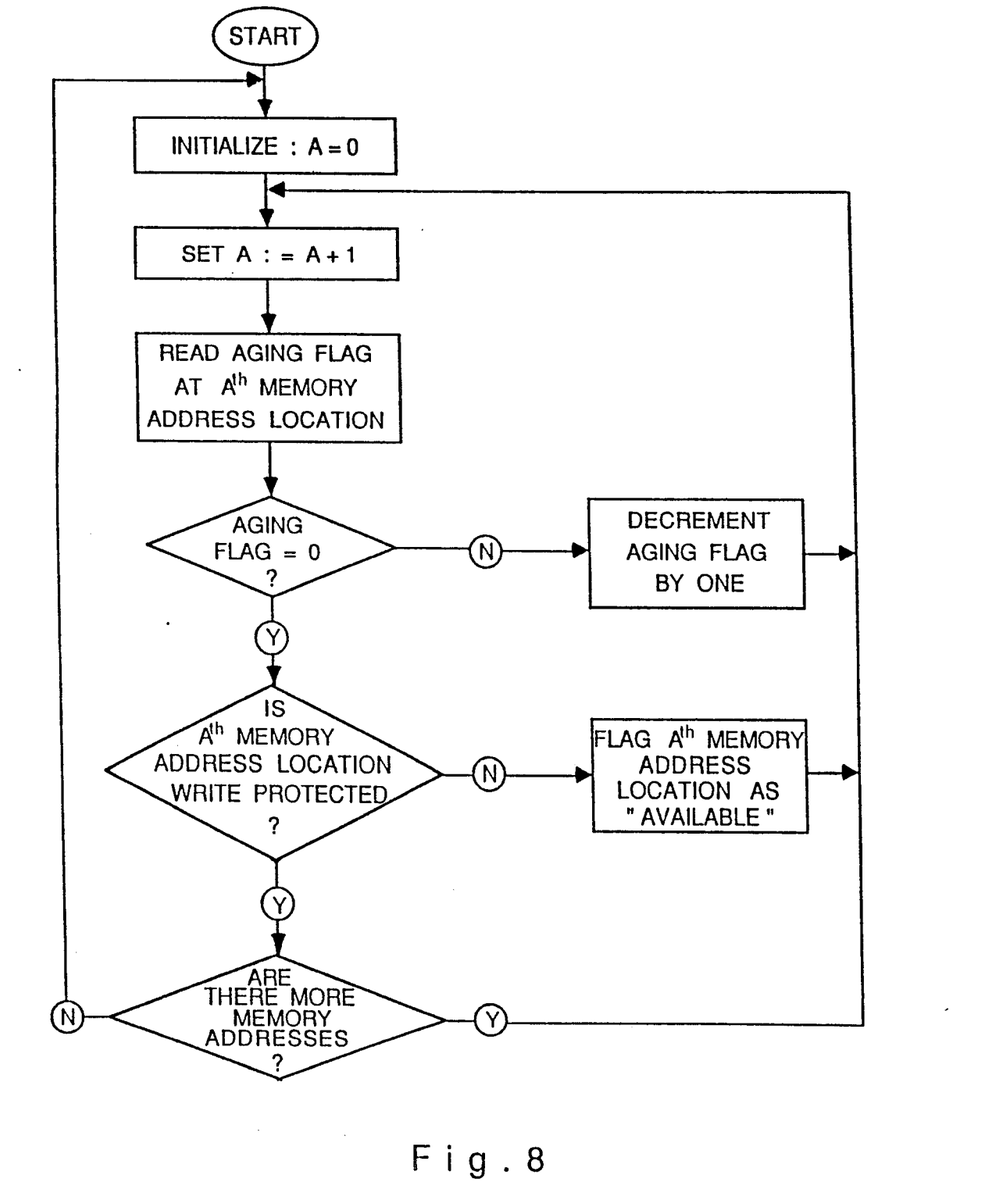
FIG. 8 is a flow diagram showing the main operating steps associated with an aging algorithm for use with the RAM and CAM shown in FIG. 2.

Finally, referring to FIG. 8 of the drawings, the principal steps associated with the aging procedure described above with respect to FIGS. 3 and 4 of the drawings, are shown. So far as aging of the RAM data is concerned, each addressable location in the third RAM 37 is read sequentially and decremented by one unless its value is already zero. An age of zero constitutes an upper age threshold which indicates that no data has been transmitted within a predetermined period of time to the bridge 12 from the source address stored in the corresponding addressable location of the first RAM 35. Under such circumstances, there is no need to retain this source address within the first RAM 35 unless, of course, it is write-protected, and an aging flag of zero indicates that the corresponding addressable location in the first RAM 35 is available.

The aging procedure associated with the CAM array 50 shown in FIG. 4 is slightly different in that aging is irrelevant so far as the write-protected area of the CAM array 50 is concerned. Thus, there is stored in the start count register 58 (shown in FIG. 4) a marker pointing to the first addressable location of the write-unprotected area of the CAM array 50 and the corresponding aging flag associated with this and subsequent addressable locations is read from the CAM AGE RAM 52 and thereafter processed exactly as for the third RAM 37.

It will be understood that the aging procedure permits a new network configuration to be learned within a short period of time in the event that network nodes are exchanged or otherwise modified. In such case, source addresses corresponding to different network nodes may alter and, in this case, it is obviously important that the contents of the look-up table 25 be updated accordingly. This is effected automatically on account of the aging procedure since, after a short period of time, data stored in the look-up table 25 is refreshed.

It will be appreciated that whilst separate RAMs are employed for the storage of the write-protect bit and the aging flag, if desired the first RAM 35 may have such capacity that the write-protect bit and the aging flag can be stored therein for each corresponding addressable location. Likewise, each addressable location in the CAM array 50 may be able to store the aging flag in addition to the source address itself.

The invention thus permits a relatively small RAM block to be employed together with a small number of associated CAMs, such that a destination address may be looked up by reading a single addressable location in the RAM and scanning all of the addressable locations in the CAM, substantially simultaneously. This avoids the need to scan each addressable location in RAM sequentially which would be extremely time-consuming or of storing all of the source addresses in a large number of CAMs, which would be extremely expensive.

Such an approach relies on the assumption that, at any given time, most source addresses can be stored in the RAM since their 16 LSB will be different and they can therefore be accommodated in different addressable locations of the RAM. It will be understood, in this regard, that only if this is not the case and the 16 LSB of two different source addresses are identical, then since only one of the source addresses can be accommodated in the corresponding addressable location of the RAM, the remaining source address must be accommodated in the CAM. Thus, the CAM effectively acts as an overflow for storing those source addresses whose 16 LSB point to an addressable location in RAM which is not available. It may be shown that providing a sufficiently large number of bits is allocated for the first code pointing to the addressable location in RAM, the probability of a source address giving rise to an identical first code, and thus requiring CAM storage, is small. On this basis, most source addresses can, in fact, be stored in the RAM and the CAM array need contain only a small number of CAMs.

Finally, it will be noted that whilst, the preferred embodiment has been described with particular reference to a RAM having $2^{16}$ addressable locations each for storing a 32 bit address and to a CAM array having 1024 addressable locations each for storing a 48 bit address, these figures are illustrative only of the approach according to the invention. In general, the RAM is provided with m addressable locations each for storing an n bit address, whilst the CAM array is provided with k addressable locations each for storing an (m+n) bit address.

MATHEMATICAL ANALYSIS

A. Definitions

1. FDDI_ADDRESS—the number of different addresses belonging to the FDDI side of a given bridge from which data has been transmitted during the current aging period.

2. N_PROB—the number of addresses which cannot be accommodated in the RAM and must be learned by the CAM.

3. N_PROB %—the percentage of N_PROB out of FDDI_ADDRESS.

4. m—the length of the first code pointing to a specific addressable location in RAM.

5. $P_{(i)}$—the probability of an m long first code being common to i out of the FDDI_ADDRESS addresses.

6. p—the probability of any address requiring to be entered into a specific addressable location in RAM ($=\frac{1}{2^m}$).

B. Assumptions

The FDDI_ADDRESS addresses are randomly distributed.

This assumption is true for m≦24, since most of the 24 MSB of a node's address are company specific i.e. are allocated by the manufacturer.

C. Basic Calculation Formulae

N_PROB is calculated according to:

$$N\_PROB = \sum_{i=2}^{FDDI\_ADDRESS} [P_{(i)} * 2^m] * (i-1)$$

Where
$P_{(i)}$ is calculated according to Newton's theorem as follows:

$$P_{(i)} = \binom{i}{FDDI\_ADDRESS} * (p)^i * (1-p)^{(FDDI\_ADDRESS-i)}$$

D. Calculations

Tables 1 and 2 present the calculated values for N_PROB and N_PROB % as a function of m, for FDDI_ADDRESS values of 10K and 20K, respectively.

TABLE 1

| | FDDI_ADDRESS = 10K | |
|---|---|---|
| m | N_PROB | N_PROB % |
| 14 | 2625 | 25.7 |
| 15 | 1415 | 13.8 |
| 16 | 755 | 7.4 |
| 17 | 370 | 3.6 |
| 18 | 195 | 1.9 |

TABLE 2

| | FDDI_ADDRESS = 20K | |
|---|---|---|
| m | N_PROB | N_PROB % |
| 14 | 9670 | 48.0 |
| 15 | 5240 | 25.6 |
| 16 | 3130 | 15.3 |
| 17 | 1495 | 7.3 |
| 18 | 820 | 4.0 |

Note that N_PROB is the average distribution of the addresses which cannot be accommodated in a RAM having $2^m$ addressable locations. The associated Standard Deviation is small owing to the basic assumption of numerous independent events. Therefore, the values calculated for N_PROB are very good approximations of the effective numbers of addresses for which there is no room in RAMs of the corresponding capacities.

Note that the actual number of active nodes on the FDDI side of a given bridge may be much bigger than FDDI_ADDRESS, since it includes also nodes that transmit locally only.

Figure 9:
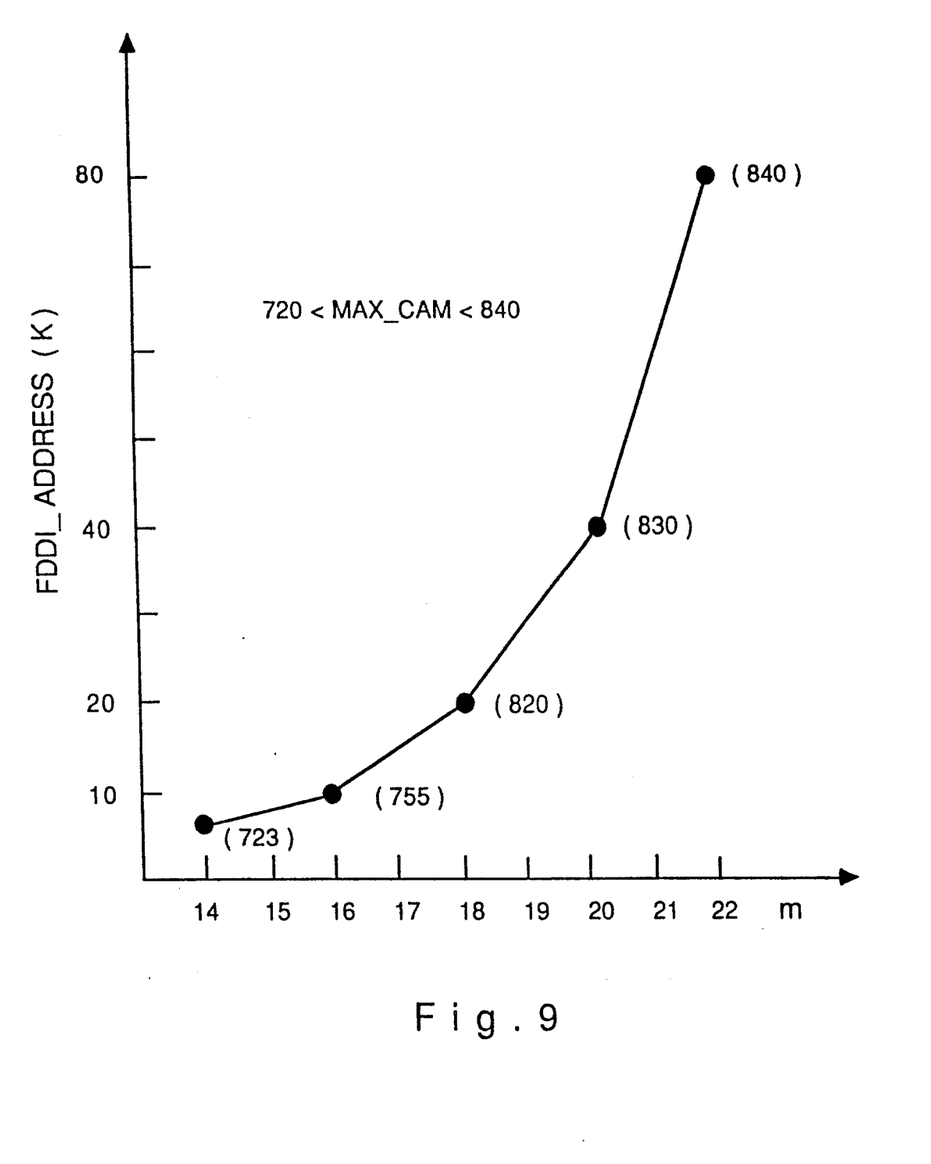
FIG. 9 is a graphical representation showing the variation in N_PROB as a function of m for $720 < N\_PROB < 840$ and relates to a mathematical analysis on which the invention is based.

FIG. 9 shows graphically FDDI_ADDRESS as a function of m for 720<N_PROB<840.

Figure 10:
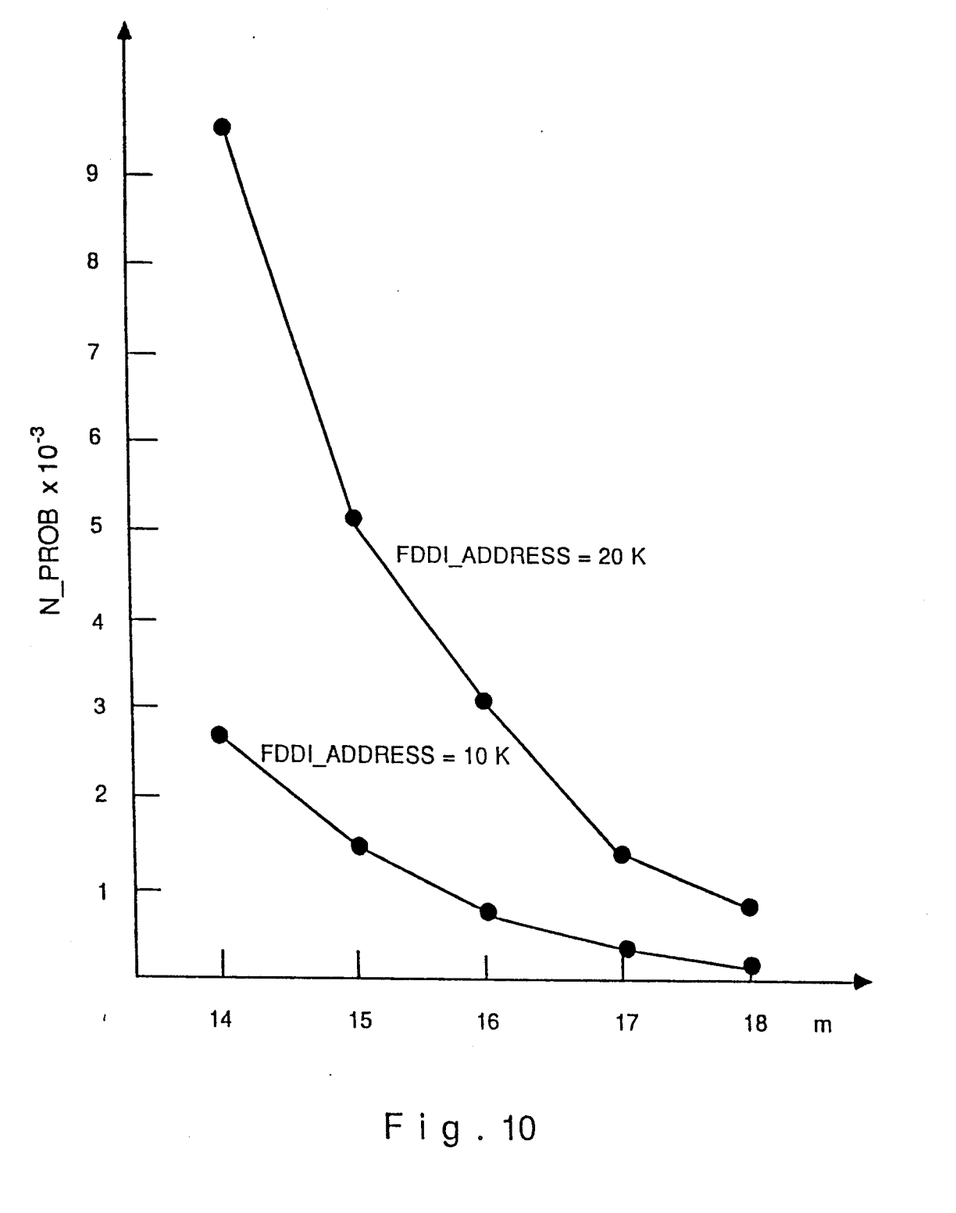
FIG. 10 is a graphical representation showing the variation in N_PROB as a function of m for 10K and 20K addresses stored in the look-up table.

FIG. 10 shows graphically N_PROB as a function of m for FDDI_ADDRESS having values of 10K and 20K.

E. Size of CAM Array

The number of CAMs required depends on the expected FDDI_ADDRESS and on the capacity of the RAM ($2^m$). let:

α=minimum[(CAM capacity*100)/N_PROB; 100%]

β=the probability of an address which has been learnt by the CAM during the previous aging period still being stored therein.

To ensure full coverage (β=100%), the capacity of the CAM array must match N_PROB (α=100%).

However, an acceptable coverage (β) can be reached with α<<100%, owing to the tendency of the incoming destination addresses to be repeated within a short time span relative to the aging period.

I claim:

1. In a bridge for interconnecting first and second networks in a data communications system, each network including a plurality of nodes having respective source addresses, said bridge being responsive to a destination address associated with a data transmission reaching the bridge from one of the nodes in the first network for forwarding the data transmission to the second network unless the destination address corresponds to an address in the first network, said source and destination addresses each having a total of (m+n) binary data bits;

a look-up table for storing the destination addresses therein, comprising:

an encoding means responsive to an (m+n) bit address for producing first and second codes having respectively m and n bits of data which together allow the (m+n) bit address to be decoded unambiguously,         a random access memory (RAM) coupled to the encoding means and having m addressable locations each for storing at least n bits of data, and         a contents addressable memory (CAM) coupled to the encoding means and having a plurality of addressable locations each for storing at least (m+n) bits of data; wherein:

if the location in RAM whose address is equal to the first code is available, then the second code is stored in said location,         if the location in RAM whose address is equal to the first code is not available and the second code is not stored therein already, then all (m+n) bits of said (m+n) bit address are stored in an available location in the CAM unless they are stored therein already, and         a destination address is looked up by reading the contents of the CAM as well as the contents of the location in the RAM whose address is equal to the first code.

2. The look-up table according to claim 1, wherein the first code is equal to the m least significant bits of the (m+n) bit address and the second code is equal to the n most significant bits thereof.

3. The look-up table according to claim 1, wherein the encoding means is responsive to the source address for producing the first and second codes.

4. The look-up table according to claim 3, wherein the first code is equal to the m least significant bits of the source address and the second code is equal to the n most significant bits thereof.

5. The look-up table according to claim 1, further including a write protect means coupled to the RAM and to the CAM for write protecting preselected addressable locations therein so as not to be subsequently available for the storage of new data.

6. The look-up table according to claim 5, wherein:

there is stored in respect of each addressable location in the RAM a write protect flag which marks the respective addressable location as unavailable when set to a predetermined value, and     the write protect means includes means for altering the write protect flag.

7. The look-up table according to claim 6, wherein the write protect flag is a single binary data bit.

8. The look-up table according to claim 5, wherein:

said preselected addressable locations in the CAM are all contained within a predetermined range of addressable locations, and     the write protect means includes routing means for routing data to an available addressable location within said predetermined range.

9. The look-up table according to claim 5, further including an aging control coupled to the RAM and to the CAM for successively updating an aging flag associated with a respective one of the addressable locations in the RAM and in the CAM in accordance with an elapsed time since storage of data in the respective addressable location until the aging flag reaches a predetermined upper age threshold whereupon the respective addressable location becomes available for storing new data unless the respective addressable location is write protected;

said aging flag being reset to a predetermined lower age threshold whenever data is stored in the respective addressable location.

10. The look-up table according to claim 9, wherein each aging flag includes at least one binary data bit stored in respect of the respective addressable location.

* * * * *